United States Patent [19]

Cole

[11] 4,419,706

[45] Dec. 6, 1983

[54] MODE SWITCHING MECHANISM FOR A CASSETTE TAPE RECORDER

[76] Inventor: Sylvan Cole, 8376 Westlawn Ave., Los Angeles, Calif. 90045

[21] Appl. No.: 372,440

[22] Filed: Apr. 27, 1982

[51] Int. Cl.$^3$ .............................................. G11B 5/54
[52] U.S. Cl. ...................................... 360/105; 360/93
[58] Field of Search ................. 360/105, 74.1, 75, 69, 360/137, 93

[56] References Cited

U.S. PATENT DOCUMENTS 4,052,742  10/1977  Pastor et al. .................... 360/105 X
4,232,349  11/1980  Kobayashi .......................... 360/105

Primary Examiner—John H. Wolff
Attorney, Agent, or Firm—W. Edward Johansen

[57] ABSTRACT

The present invention is a retracting mechanism for use in combination with a tape recorder. The tape recorder includes a base plate, a capstan drive for driving a magnetic tape in a tape cassette and an electronic circuit. A magnetic head is disposed adjacent to the magnetic tape and is electrically coupled to a electronic circuit. A slidable mount for mounting the magnetic head is slidably coupled to the base plate so that the magnetic head may move bidirectionally in a direction orthogonal to the direction which the magnetic tape travels across the face of the magnetic head in order to engage the magnetic tape. The retracting mechanism includes a lever arm which is pivotally coupled to the base plate and disposed adjacent, but not continguous to, the capstan drive. A pinch roller the axis of which is rotatably coupled to the lever arm. A first spring resiliently biases the lever arm so that the pinch roller pinches the magnetic tape against the capstan drive. A second spring for resiliently biases the slidable mount so that the magnetic head engages the magnetic tape. A coupling device couples the lever arm and the slidable mount so that when the slidable mount moves the magnetic head away from the magnetic tape the coupling device pivotally moves the lever arm so that the pinch roller disengages the magnetic tape whereby the pinch roller is mechanically independent of the magnetic head when the magnetic head and the pinch roller engage the magnetic tape.

2 Claims, 5 Drawing Figures

Fig. 4.
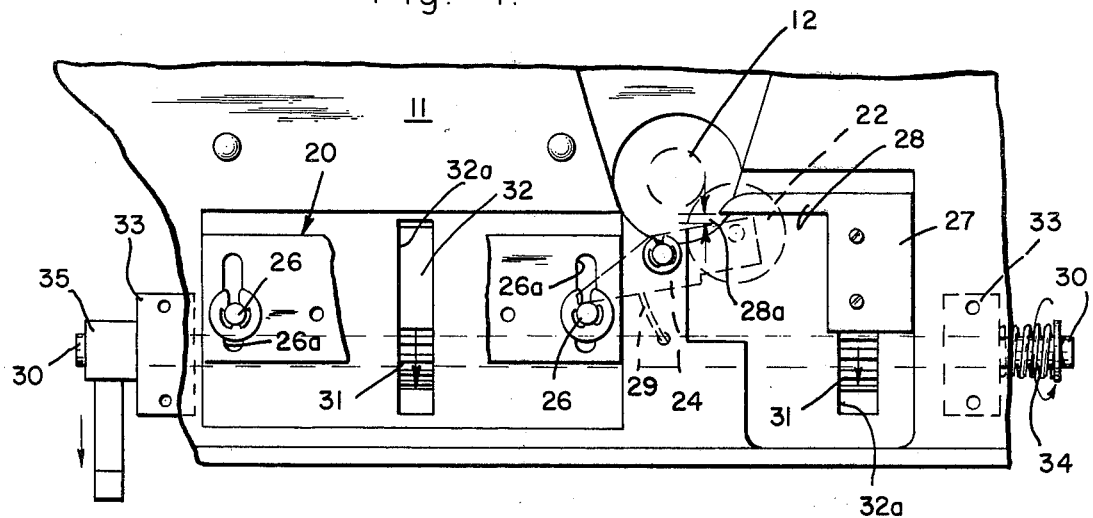
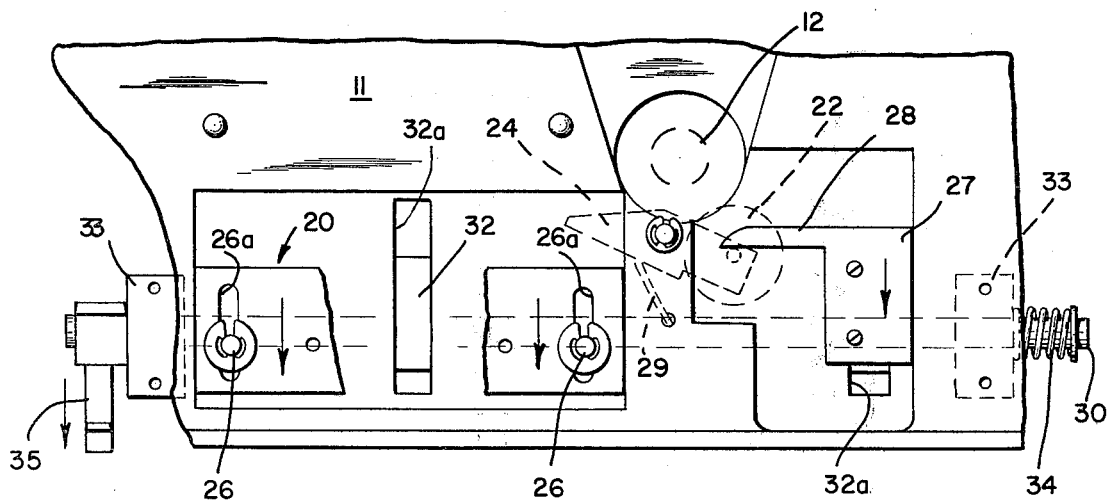
Fig. 5.

MODE SWITCHING MECHANISM FOR A CASSETTE TAPE RECORDER

BACKGROUND OF THE INVENTION

1. Field of the Invention

The present invention relates to a retracting mechanism for disengaging a magnetic head and a pinch roller from a magnetic tape and more particularly to a retracting mechanism so that the pinch roller is mechanically independent of the magnetic head.

2. Description of the Prior Art

U.S. Pat. No. 4,149,203, entitled Tape Recorder, issued to Minoru Kobayashi on Apr. 10, 1979, teaches a tape recorder which is provided with a controlling mechanism which includes a rockable control lever, a magnetic head support lever for supporting a magnetic head and a pinch roller support lever for supporting a pinch roller. The magnetic head support lever and the pinch roller support lever are mounted rockably and coaxially with each other. A first spring is stretched between the control lever and the head support lever to shift the magnetic head toward the tape accompanying the rocking motion of the control lever. A second spring is stretched between the control lever and the pinch roller support lever to shift the pinch roller toward the tape accompanying the rocking motion of the control lever. At least one of the first and second springs os charged with a returning force accompanying the magnetic head and the pinch roller shifting toward the tape whereby the controlling mechanism is capable of disjunctively controlling the magnetic head and the pinch roller away from the tape.

U.S. Pat. No. 4,188,647, entitled Cassette Type Tape Recorder, issued to Shinsaku Tanaka on Feb. 12, 1980, teaches a cassette tape recorder which includes a base plate and magnetic head carrying board which supports a magnetic head and a pinch roller and which has a cam pin inserted on one end portion. The cam pin is inserted into a cam hole in the base plate whereby the magnetic head and the pinch roller may be gradually rotated into place.

U.S. Pat. No. 3,832,735, entitled Cassette Loading and Unloading Apparatus, issued to Llyod K. Childress, Jr., George B. Flippen, Jr., and Louis M. McDaniels on Aug. 27, 1974, teaches a loading and unloading apparatus for a magnetic tape cassette which includes a retractable mechanism for inserting a read/write head and a pinch roller into the cassette. During the first extent of the travel of the door of the loading and unloading apparatus in opening the read/write head and the pinch roller are withdrawn from the cassette while the cassette is maintained in position.

U.S. Pat. No. 4,272,792, entitled Mode Changing System for a Cassette Tape Recorder, issued to Niro Nakamichi, Kozo Kobayashi and Hideo Kawachi, teaches a mode changing system for a cassette tape recorder wherein the operating members, such as the head plate and a pinch roller are moved in accordance with the operating modes of the cassette tape recorder.

U.S. Pat. No. 4,303,954, entitled Control Device for a Tape Recorder, issued to Fritz Wisser on Sept. 1, 1981, teaches a control device which includes a mount for a pinch roller which is movably mounted on a base plate in a direction of movement between an operating position and a rest position.

U.S. Pat. No. 4,196,874, entitled Drive Apparatus for a Tape Recorder, issued to Kenji Ohara on Apr. 8, 1980, teaches a drive apparatus for a tape recorder which includes a pair of spaced apart selectively driven wheels, a motor and a drive wheel is located between parallel planes and is selectively rotated in first and second opposed rotary directions by means of the motor. The apparatus also includes an idler wheel engaging the drive wheel so as to be rotated thereby and a pivotally mounted support arm rotatably carrying the idler wheel and being swingable between a first position where the idler wheels bears against one of the driven wheels for driving the latter from the drive wheel and a second position where the idler wheel bears against the other of the driven wheels for driving the other driven wheel fron the drive wheel. The drive apparatus further includes a non-contacting magnetic means including at least one coupling member which is spaced apart from the idler wheel for magnetically coupling the idler wheel with the support arm so as to yieldably resist relative motion thereof and thereby cause swinging of the support arm to the first and second positions in response to the rotation of the drive wheel in the first and second rotary directions, respectively.

U.S. Pat. No. 4,196,875, entitled Magnetic Tape Recording and/or Reproducing Apparatus, issued to Masaichiro Tatckawa, Toshiharu Sasaki and Yoshihito Urata, teaches a magnetic tape recording and/or reproducing apparatus which includes in combination a capstan driving motor, a pair of tape winding means, a reel driving motor, a pinch roller and at least one idel wheel.

U.S. Pat. No. 4,253,128, entitled Dual Spring Loaded Operating Mechanism for a Tape Recorder, issued to Shoichi Saito and Hirpyuki Yamada on Feb. 24, 1981, teaches a pinch roller supporting fitting which operates in conjunction with a spring which biases the pinch roller against a capstan drive shaft.

U.S. Pat. No. 4,232,349, entitled Mode Switching Mechanism for a Cassette Tape Recorder, issued to Minoru Kobayashi on Nov. 4, 1980, teaches a support lever for a magnetic head and a pinch roller.

In each of the above retracting mechanisms for the magnetic head and the pinch roller of the tape recorder of the prior art the pinch roller is mechanically coupled to magnetic head. When both the pinch roller and the magnetic head engage the magnetic tape, any eccentricity of the pinch roller, such as a flat spot, cause a movement of the pinch roller support lever. This movement is transmitted to the magnetic head through the retracting mechanism and causes a distortion to the recording and/or playing signals of the tape recorder. In none of the retracting mechanisms is the pinch roller mechanically independent of the magnetic head, when the pinch roller and the magnetic head engage the magnetic tape, and retractably coupled, when the magnetic head and the pinch roller disengage the magnetic tape.

SUMMARY OF THE INVENTION

In view of the foregoing factors and conditions which are characteristic of the prior art it is the primary object of the present invention to provide a retracting mechanism for disengaging a magnetic head and a pinch roller from a magnetic tape in which the pinch roller is mechanically independent 21 the magnetic head.

In accordance with the present invention an embodiment of a retracting mechanism for use in combination with a tape recorder is described. The tape recorder includes a base plate, a capstan drive for driving a magnetic tape in a tape cassette and an electronic circuit. A magnetic head is disposed adjacent to the magnetic tape and is electrically coupled to a electronic circuit. A slidable mount for mounting the magnetic head is slidably coupled to the base plate so that the magnetic head may move bidirectionally in a direction orthogonal to the direction which the magnetic tape travels across the face of the magnetic head in order to engage the magnetic tape. The retracting mechanism includes a lever arm which is pivotally coupled to the base plate and disposed adjacent, but not contiguous to, the capstan drive. A pinch roller the axis of which is rotatably coupled to the lever arm. A first spring resiliently biases the lever arm so that the pinch roller pinches the magnetic tape against the capstan drive. A second spring for resiliently biases the slidable mount so that the magnetic head engages the magnetic tape. A coupling device couples the lever arm and the slidable mount so that when the slidable mount moves the magnetic head away from the magnetic tape the coupling device pivotally moves the lever arm so that the pinch roller disengages the magnetic tape whereby the pinch roller is mechanically independent of the magnetic head when the magnetic head and the pinch roller engage the magnetic tape.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 4 is a top plan view of the retracting mechanism of FIG. 1 when the magnetic head and the pinch roller engage the magnetic tape.

FIG. 5 is a top plan view of the retracting mechanism of FIG. 1 when the magnetic head and the pinch roller have disengaged the magnetic tape.

DESCRIPTION OF THE PREFERRED EMBODIMENT

Figure 1:
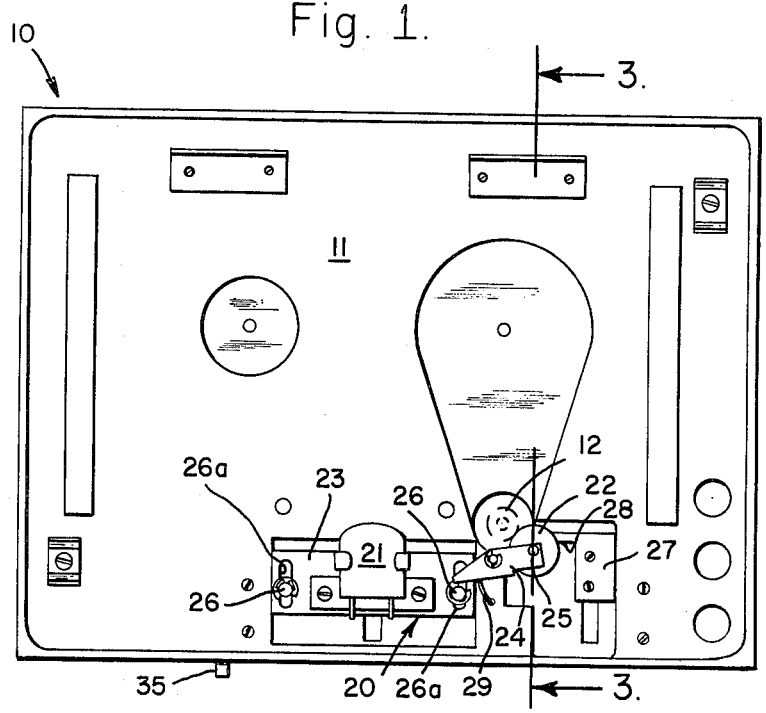
FIG. 1 is a top plan view of a base plate and a retracting mechanism for disengaging a magnetic head and a pinch roller from a magnetic tape which is used in combination with a tape recorder and which has been constructed in accordance with the principles of the present invention.

In order to best understand the present invention it is necessary to refer to the following description of its preferred embodiment in conjunction with the accompanying drawing. Referring to FIG. 1 a tape recorder 10 which includes a base plate 11, a capstan drive 12 for driving a magnetic tape in a tape cassette and an electronic circuit. A retracting mechanism 20 for disengaging a magnetic head 21 and a pinch roller 22 from the magnetic tape is used in combination with the tape recorder 10. The retracting mechanism 20 includes the magnetic head 21 which is disposed adjacent to the magnetic tape and which is electrically coupled to the electronic circuit and a slidable mount 23 on which the magnetic head 21 is mounted and which is slidably coupled to the base plate 11 so that the slidable mount 21 may move the magnetic head 21 bidirectionally in a direction orthogonal to the direction which the magnetic tape travels across the face of the magnetic head 21 in order to engage the magnetic tape. The retracting mechnism 20 also includes a lever arm 24 which is pivotally coupled to the base plate 11 and which is disposed adjacent, but not contiguous to, the capstan drive 12 and the pinch roller 22 having a shaft 25 which is rotatably coupled to the lever arm 24.

Still referring to FIG. 1 the retracting mechanism 20 further includes slide-coupling posts 26 each of which is slidably coupled to a slot 26a in the sliding mount 23 and a slidable plate 27 which is slidably coupled to the base plate 11 and which has a hook arm 28 for engaging the shaft 25 of the pinch roller 25. A first spring resiliently biases the pinch roller 22 against the capstan drive 12.

Figure 2:
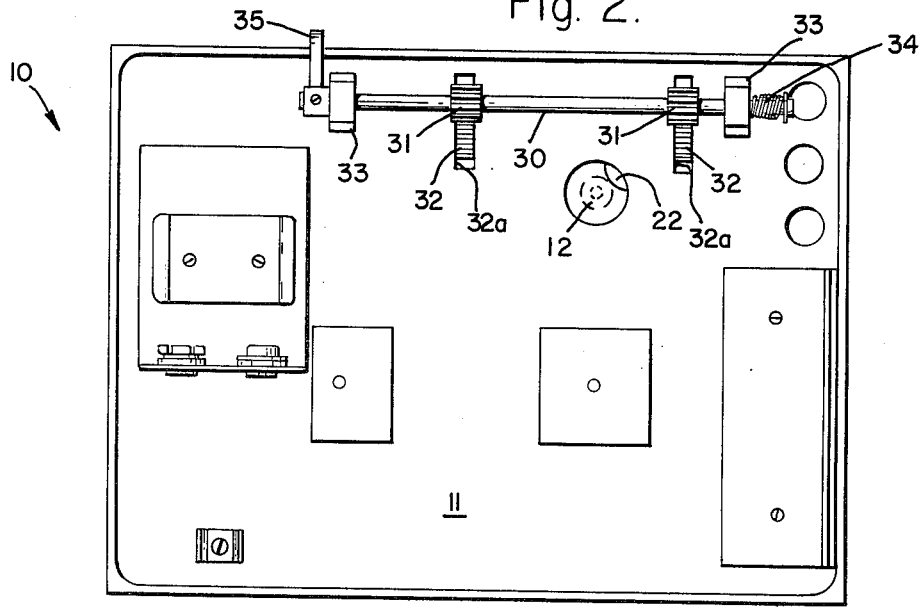
FIG. 2 is a bottom plan view of the base plate and the retracting mechanism of FIG. 1.
Figure 3:
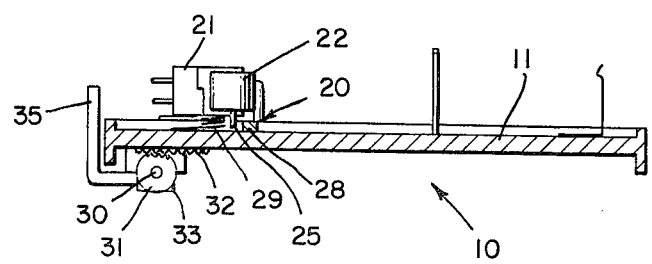
FIG. 3 is a side elevational view in cross-section of the base plate and the retracting mechanism of FIG. 1.

Referring to FIG. 2 in conjunction with FIG. 3 the retracting mechanism 20 still further includes an axle 30, a pair of round gears 31 each of which is snugly coupled to the axle 30 adjacent, but not contiguous, to one of its ends, a pair of flat gears 32 each of which is disposed in one of a pair of slots 32a in the base plate 11 and each of which is aligned with one of the round gears 31 so that each round gear 31 engages one of the flat gears 32, and a pair of axial mounts 33 which axially mount the axle 30 whereby the axle 30 is rotatably coupled to the pair of axial mounts 33. A second spring 34 resiliently biases the slidable mount 23 so that the magnetic head 21 engages the magnetic tape.

Referring to FIG. 1 in conjunction with FIG. 2 and FIG. 3 one of the flat gears 33 is fixedly coupled to the slidable mount 23 and the other flat gear 33 is fixedly coupled to the slidable plate 24 so that when the slidable mount 23 moves the magnetic head 21 away from the magnetic tape the hook 28 of the slidable plates 27 pivotally moves the lever arm 24 so that the pinch roller 22 disengages the magnetic tape. The pinch roller 22 is mechanically independent of the magnetic head 21 when the magnetic head 21 and the pinch roller 22 engage the magnetic tape.

Referring to FIG. 2 in conjunction with FIG. 4 the pinch roller 22 is mechanically independent of the magnetic head 21 when the magnetic head 21 and the pinch roller 22 engage the magnetic tape because the hook 28 of the slidable plate 27 is spaced apart a distance 28a from the shaft 25 of the pinch roller 22. The hook 28 of the slidable plate 27 does not contact the shaft 25 of the pinch roller 22 when the pinch roller 22 engages the magnetic tape. The pinch roller 22 may either have a flat spot or be non-eccentric. If the hook 28 were to contact the shaft 25 of the pinch roller 22, then when the pinch roller 22 rotates non-eccentrically thereby creating either a bounce or a wobble which is transmitted to the lever arm 24, which is mounted to the base plate 11. If the lever arm were mounted to the slidable mount 23 on which the magnetic head 21 is mounted, then the bounce or wobble would be transmitted to the magnetic head 21.

Referring to FIG. 2 in conjunction with FIG. 5 the pinch roller 22 is mechanically coupled to the magnetic head when the magnetic head 21 disengages the magnetic tape because the coupling mechanism couples the lever arm 24 to the slidable mount 23 so that when the slidable mount 23 moves the magnetic head 21 away from the magnetic tape the coupling mechanism pivotally moves the lever arm 24 so that the pinch roller 22 disengages the magnetic tape.

Referring to FIG. 4 in conjunction with FIG. 5 in operation the coupling mechanism has the slidable plate 27 which has the hook 28 slidably coupled to the base plate 11 so that the slidable plate 27 moves bi-directionally in the same direction which the slidable mount 23 moves wherein when the slidable plate 27 moves away from the magnetic tape the slidable plate 27 moves an incremental distance and as the hook engages the end of the shaft 25 of the pinch roller 22 the slidable plate 27 continues to move causing the hook to pivotally rotate the lever arm 24 thereby disengaging the pinch roller 22 from the magnetic tape. The axle 30 is disposed orthogonally to the direction which the slidable mount 23 and the slidable plate 27 move and is rotatably coupled to the base plate 11. The axle 30 is also disposed adjacent, but not contiguous, to the slidable mount 23 and the slidable plate 27. The first round gear 31 is fixedly and axially coupled to the axle 30 at one end and the second round gear 32 fixedly and axially coupled to the axle 30 at the other end. The first flat gear 32 is disposed in a first slot in the base plate 11 and aligned with the first round gear 31 so that the first round gear 31 engages the first flat gear 32. The first flat gear 32 is fixedly coupled to the slidable mount 23. The second flat gear 32 is disposed in a second slot in the base plate 11 and aligned with the second round gear 31 so that the second round gear 31 engages the second flat gear 32. The second flat gear 32 is fixedly coupled to the slidable plate 27. The teeth of the first and second round gears 31 are parallelly aligned with each other. The teeth of the first and second flat gears 32 are also parallelly aligned so that the slidable mount 23 and the slidable plate 27 move together along parallel paths in the first and second slots in the base plate 11.

The retracting mechanism 20 further still includes an L-shaped lever arm 35 which is fixedly and axially coupled to the axle 30 so that the L-shaped lever arm 35 may rotate the axle 30 thereby causing the magnetic head 21 and the pinch roller 22 to disengage the magnetic tape.

From the foregoing it can be seen that a retracting mechanism for disengaging a magnetic head and a pinch roller from a magnetic tape for use in combination with a tape recorder has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention present invention.

What is claimed is:

1. A retracting mechanism for disengaging a magnetic head and a pinch roller from a magnetic tape for use in combination with a tape recorder which includes a base plate, a capstan drive for driving the magnetic tape in a tape cassette and an electronic circuit, said retracting mechanism comprising:

a. a magnetic head disposed adjacent to the magnetic tape and electrically coupled to the electronic circuit;

b. slidable mounting means for mounting said magnetic head slidably coupled to the base plate so that said magnetic head may move bidirectionally in a direction orthogonal to the direction which the magnetic tape travels across the face of said magnetic head in order to engage the magnetic tape;

c. a lever arm which is pivotally coupled to the base plate and disposed adjacent, but not contiguous to, said capstan drive;

d. a pinch roller the axis of which is rotatably coupled to said lever arm;

e. first resiliently biasing means for resiliently biasing said lever arm so that said pinch roller pinches the magnetic tape against the capstan drive;

f. second resiliently biasing means for resiliently biasing said slidable mounting means so that said magnetic head engages the magnetic tape; and f. coupling means for coupling said lever arm and said slidable mounting means so that when said slidable mounting means moves said magnetic head away from the magnetic tape said coupling means pivotally moves said lever arm so that said pinch roller disengages said magnetic tape whereby said pinch roller is mechanically independent of said magnetic head when said magnetic head and said pinch roller engage the magnetic tape.

2. A retracting mechanism according to claim 1 wherein said coupling means comprises:

a. a slidable plate which has a hook slidably coupled to the base plate so that said slidable plate moves bidirectionally in the same direction which said slidable mounting means moves wherein when said slidable plate moves away from the magnetic tape said slidable plate moves an incremental distance and as said hook engages the end of the axis of said pinch roller said slidable plate continues to move causing said hook to pivotally rotate said lever arm thereby disengaging said pinch roller from the magnetic tape;

b. an axle disposed orthogonally to the direction which said slidable mounting means and slidable plate move and rotatably coupled to the base plate, said axle also being disposed adjacent, but not contiguous, to said slidable mounting means and said slidable plate;

c. a first round gear fixedly and axially coupled to said axle at one end;

d. a second round gear fixedly and axially coupled to said axle at the other end;

e. a first flat gear disposed in a first slot in the base plate and aligned with said first round gear so that said first round gear engages said first flat gear, said first flat gear being fixedly coupled to said slidable mounting means; and f. a second flat gear disposed in a second slot in the base plate and aligned with said second round gear so that said second round gear engages said second flat gear, said second flat gear being fixedly coupled to said slidable plate.

* * * * *